UNITED STATES PATENT OFFICE.

JAMES D. DARLING, OF PHILADELPHIA, PENNSYLVANIA, ASSIGNOR TO KEYSTONE TRADING COMPANY, A CORPORATION OF NEW JERSEY.

MANUFACTURE OF CHEWING-GUM.

1,005,001.  Specification of Letters Patent.  Patented Oct. 3, 1911.

No Drawing.  Application filed January 30, 1909.  Serial No. 475,180.

*To all whom it may concern:*

Be it known that I, JAMES D. DARLING, of Philadelphia, in the county of Philadelphia and State of Pennsylvania, have invented certain new and useful Improvements in the Manufacture of Chewing-Gum, whereof the following is a specification.

My invention relates to the preparation of chewing gum from certain low grade rubbers, and particularly from Pontianak rubber.

I have recently secured Letters Patent of the United States No. 907,748, dated December 29th, 1908, for chewing gum thus manufactured, and I have described in that patent the process which I consider preferable for converting Pontianak rubber into a chewing gum, namely, to subject the cleansed Pontianak to a kneading operation at a temperature of about two or three hundred degrees Fahrenheit, by which process the elasticity of the rubber content of Pontianak is almost wholly destroyed or broken down so that the mass is entirely suitable for mastication. Although I prefer to treat the rubber as described in this application yet I have found that a satisfactory chewing gum may be manufactured from Pontianak rubber by a different process which I will now describe and which forms the subject matter of the present application.

The difference between my process, previously patented, and the present one is chiefly dependent upon the question of temperature. A mass of Pontianak rubber begins to melt at about the temperature of 350 degrees Fahrenheit. This is lower than the ordinary melting point of india rubber, and I believe that the liquefaction of the mass which occurs at this temperature is not really a melting of the rubber content of the Pontianak, but is rather a process of solution of the india rubber in the melted resinous content, for the melting point of resin is lower than that of rubber.

Unless it is subjected to a temperature sufficiently high to effect liquefaction, the mass of Pontianak rubber remains too tough and elastic to be utilized as a chewing gum, unless subjected to a kneading process as described in my patent to which I have made reference, but the higher the temperature, short of the melting point, at which this kneading operation is carried on, the more rapidly is the elastic structure of the rubber broken down or "tired out", and the mass converted into a plastic substance suitable for a chewing gum. But if the heating of the mass be carried to the melting point, the nature of the substance becomes greatly changed. If pure india rubber is thus melted there results an intensely sticky viscous mass, which, so far as I have been able to ascertain is entirely unsuitable for a chewing gum, but I have discovered that by employing Pontianak rubber or a similar low grade rubber in which the resinous content predominates over the rubber, and by subjecting this to a melting or liquefying process, as I will describe, a satisfactory chewing gum may be produced without resorting to the kneading process. As above explained, this may, and in my belief is, due to the fact that the india rubber itself is not actually melted, but is merely dissolved within the melting resin, and consequently is so diffused through the mass as to lose its elasticity; but, however this may be, I find that I am able to produce by the process to be described, a chewing gum from Pontianak which has been melted without the use of any kneading process.

I take the crude Pontianak of commerce and after cleaning it and cutting it up in small pieces, I place it in a suitable receptacle, and boil it for a considerable time in an alkaline solution as described in my previous patent. When removed from the alkaline liquor and washed, this mass is odorless and tasteless and consists of a spongy mixture of rubber and resin in the proportions in which they occur in Pontianak rubber, to wit,—1 to 3. It is still however, tough and elastic. I take this purified spongy mass and heat it to the point of liquefaction. The first evidences of this begin to appear at about 325 degrees Fahrenheit, but the temperature may be raised to a considerably higher point than this, although it must not be raised too high, as at about 450 degrees, a destructive distillation begins which ruins the product. This temperature therefore affords the upper limit of temperature for my process.

The heating may be carried on in any suitable receptacle, provided with means for properly maintaining and regulating a temperature of this character, as for instance, an air bath, or a sand bath, or a vessel jacketed for high pressure steam. When the mass has become liquefied, at say a temperature of between 350 and 400 degrees, it is stirred gently, and kept in this condition for about fifteen minutes. While in this condition it is desirable to add about five per cent. of a pure vegetable wax, or some other waxy substance, which I find aids in giving the product precisely the required consistency. The mass is then allowed to cool in the same receptacle down to a temperature of about 300 degrees, at which point I add about ten per cent. of hot water. This is readily absorbed, the mass being stirred gently until the whole is homogeneous. The addition of this water destroys the tackiness of the product which is then poured off into molds and allowed to cool, and harden. In this state the product should be set aside for some weeks, for I have found that its quality improves by being allowed to stand for a considerable time. The resulting product still contains a resinous and rubber content in approximately the proportions in which they occur in Pontianak rubber, but the nature of the rubber content has been so changed by its dissolution or dissemination in the melted resin as to be deprived of its elasticity and toughness, and other qualities objectionable in a chewing gum, and in place thereof a product is obtained which is admirably suited for use in the manufacture of ordinary commercial chewing gum.

Having thus described my invention, I claim:—

1. The process of converting a low grade rubber containing a high percentage of resin into a chewing gum which consists in heating said rubber to the melting point and then allowing the mass to cool and set.

2. The process of manufacturing chewing gum which consists in subjecting crude Pontianak rubber to a purifying process, heating the purified mass until it melts; adding a small percentage of water to the melted mass, and allowing it to cool and set.

In testimony whereof, I have hereunto signed my name, at Philadelphia, Pennsylvania, this twenty-seventh day of January 1909.

JAMES D. DARLING.

Witnesses:
JAMES H. BELL,
E. L. FULLERTON.